United States Patent Office 3,288,850
Patented Nov. 29, 1966

3,288,850
MANUFACTURE OF TRIFLUOROACETIC ACID
Henry R. Nychka, Randolph Township, Morris County, and Cyril Woolf, Morristown, N.J., assignors to Allied Chemical Corporation, New York, N.Y., a corporation of New York
No Drawing. Filed July 30, 1963, Ser. No. 298,597
5 Claims. (Cl. 260—539)

This invention relates to processes for making trifluoroacetic acid, $CF_3COOH$, by hydrolysis of trifluoroacetyl chloride, $CF_3COCl$.

Prior methods for preparing substantially anhydrous trifluoroacetic acid are cumbersome and uneconomical. A representative proposed procedure involves alcohol extraction of sodium trifluoroacetate from a reaction mixture which had been evaporated to dryness. After removal of the alcohol, the residue of the extract is treated with sulfuric acid, and the mixture is then distilled in the presence of strong sulfuric acid to effect recovery of trifluoroacetic acid as overhead. Most prior art processes for recovery of substantially anhydrous trifluoroacetic acid require distillation of $CF_3COOH$ out of a concentrated sulfuric acid solution.

During development work resulting in the present improvements, in view of the prevalent prior use of sulfuric acid solutions of $CF_3COOH$, attempts were made to hydrolyze trifluoroacetyl chloride directly in aqueous sulfuric acid solutions. It was found that, on introduction of $CF_3COCl$ into e.g. 75–80% $H_2SO_4$ strength solutions at hydrolysis promoting temperatures, no hydrolysis of $CF_2COCl$ took place. With lower $H_2SO_4$ concentrations of the order of 60%, hydrolysis of $CF_3COCl$ was slight to a little better. On the other hand, when using a 50% $H_2SO_4$ solution, hydrolysis of $CF_3COCl$ to $CF_3COOH$ was substantially complete. However, recovery of $CF_3COOH$ from the weak sulfuric acid solution was found to be impossible since on distillation of the hydrolysis mixture there was recovered nothing except what was found to be a binary $CF_3COOH–H_2O$ azeotrope, boiling at about 105–106° C. and for herein practical purposes containing by weight about 80% $CF_3COOH$ and about 20% $H_2O$.

Subsequently, in accordance with the present invention, it was found that trifluoroacetyl chloride, at certain reaction conditions, hydrolyzes readily in an aqueous trifluoroacetic acid which may contain as little as a few e.g. 2–4 weight percent of water. This discovery was unexpected and surprising because aqueous trifluoroacetic acid is considered in the art on the basis of the Lewis acid scale as being equivalent to mineral acids such as sulfuric acid. Thus, while medium and strong sulfuric acids substantially or completely inhibit hydrolysis of $CF_3COCl$, to the contrary we find that, in $CF_3COOH–H_2O$ systems of low to high strength $CF_3COOH$, hydrolysis of $CF_3COCl$ proceeds rapidly and easily and to economic acceptability in systems containing as little as about 5% water.

Additionally, according to the invention, it has been found that $CF_3COOH$ may be recovered from $CF_3COOH–H_2O$ systems in which $CF_3COOH$ strengths are high. We find that, by taking advantage of the composition and boiling point of the above-noted $CF_3COOH–H_2O$ azeotrope, substantially anhydrous $CF_3COOH$ may be readily recovered from $CF_3COOH–H_2O$ systems of certain high $CF_3COOH$ strengths by simple relatively low temperature distillation easily controlled to substantially prevent contamination of $CF_3COOH$ product with azeotropic mixtures of $CF_3COOH$ and water. Moreover, it was found that, under the described operating conditions, hydrolysis of $CF_3COCl$ and elimination of HCl are remarkably complete. Experience shows that chloride, existing as HCl and/or $CF_3COCl$, is present in only trace amounts in the $CF_3COOH$ product, and usually to less than 0.2% in the distillation heel.

Recently, $CF_3COCl$ has become available in large commercial quantities. Economic advantages afforded by the invention are obvious from the foregoing and following description. In the prior art procedures, using strong sulfuric acid, process tails after distillation and recovery of $CF_3COOH$ are relatively large quantities of weak sulfuric acid which currently is substantially an economic drug in the market. The invention process eliminates use of concentrated sulfuric acid. Raw materials required are only trifluoroacetyl chloride and water, and products are substantially chloride free. As will be seen from the following, process steps are simple and direct, and only require use of conventional apparatus.

The invention process is carried out in two principal stages; a reaction or hydrolysis stage in which incoming $CF_3COCl$ is hydrolyzed by reaction with water to form $CF_2COOH$, and a distillation stage in which the hydrolysis mixture formed in the first stage is subjected to distillation under certain conditions to recover $CF_3COOH$ product and leave distillation bottoms or heel of certain composition. Operations may be batchwise, or preferably continuous. If the former, hydrolysis and distillation may be carried out successively in the same vat or container.

In this specification and claims, the term "system" embraces and refers only to $CF_3COOH$ and $H_2O$ constituents. Unless otherwise indicated by context, percentage values (all by weight) refer to relative weight proportions of $CF_3COOH$ and $H_2O$, i.e. in a reaction medium, which might contain materials other than $CF_3COOH$ and $H_2O$, percentage values designate relative weight proportions of $CF_3COOH$ and $H_2O$. While for practical purposes the liquid reaction medium into which incoming $CF_3COCl$ is charged ordinarily and preferably does substantially consist of $CF_3COOH$ and $H_2O$, other liquid or material substantially non-deleterious and/or inert to the reactants, reaction, products and by-products may be present. Hence, "reaction medium" may substantially consist of $CF_3COOH$ and $H_2O$, or may contain $CF_3COOH$, $H_2O$ and inerts.

General practice of the invention processes include forming a liquid reaction medium comprising a $CF_3COOH–H_2O$ system containing at least 10% of $H_2O$ and not more than 90% of $CF_3COOH$, introducing $CF_3COCl$ into such medium while maintaining the same at hydrolyzing temperatures substantially in the range of 20–60° C. to thereby effect reaction of $CF_3COCl$ with $H_2O$ to form $CF_3COOH$; continuing introduction of $CF_3COCl$ for a time sufficient to raise the percentage of $CF_3COOH$ in said system to an increasingly higher value which is not more than about 95% but is at least 85%; and recovering substantially anhydrous $CF_3COOH$ from the resulting mass.

Objective of the reaction or hydrolysis stage of the invention processes is to effect reaction of incoming $CF_3COCl$, usually in gas form, with available water which is a constituent of an aqueous trifluoroacetic acid solution to hydrolyze $CF_3COCl$ to form in the reactor a $CF_3COOH–H_2O$ system having certain relatively high $CF_3COOH$ strengths. Apparatus required for hydrolysis may comprise any suitable reactor provided with an inlet for water and/or aqueous $CF_3COOH$ solution, an inlet for gaseous $CF_3COCl$, and an HCl by-product gas outlet connected to a water scrubber. The reactor may be equipped with accessories for determination and maintenance of reaction temperatures, and with a "cold finger" associated with the gas exit pipe and arranged to trap and condense any unreacted $CF_3COCl$ (B.P. minus 20° C.) which pass through the reactor.

Hydrolysis temperatures to be maintained in the reactor are substantially in the range of 20–60° C. Temperatures below about 20° C. afford no advantages as to hydrolysis promotion, and temperatures above 60° C. are not desirable because higher temperatures tend to promote carryover of product $CF_3COOH$ with liberated HCl.

At start-up of an operation, the reactor may be charged with a suitable amount of straight water (containing no $CF_3COOH$). When water in the reactor is brought to the desired hydrolysis temperature, introduction of $CF_3COCl$ gas is started. On initiation of $CF_3COCl$ feed, hydrolysis proceeds rapidly and $CF_3COOH$ content of the reactor liquor builds up correspondingly. Rate of feed of $CF_3COCl$ gas preferably is adjusted so that $CF_3COCl$ is reacted substantially as fed. Too high $CF_3COCl$ feed rate may be detected by condensation of $CF_3COCl$ in the trap of a cold finger associated with the gas exit pipe of the reactor. As hydrolysis with formation of $CF_3COOH$ get under way, evolution of HCl commences, and HCl byproduct may be picked up in a water scrubber connected to the gas exit pipe of the reactor.

Gassing with $CF_3COCl$ is continued until the percentage of $CF_3COOH$ in the $CF_3COOH–H_2O$ system in the reactor is increased to at least 85% and not more than about 95%, preferably not more than about 92%. Desired end points be conveniently determined by acid titration of the hydrolysis solutions. When the indicated values in the range of 85–95% are reached, if operation is batchwise, input of $CF_3COCl$ gas is shut off. Thereafter, the mass in the reactor is subjected to distillation under conditions to form an overhead boiling at substantially 72° C. at atmospheric pressure. Such condensation on condensation constitutes the substantially anhydrous $CF_3COOH$ product of the process. Whatever the $CF_3COOH$ content of the $CF_3COOH–H_2O$ system distilled, distillation is carried out in accordance with conventional techniques and is continued until there is formed in the still a distillation residue or heel comprising a $CF_3COOH–H_2O$ system containing less $CF_3COOH$ than the liquor mass at the start of distillation, not more than 18% $H_2O$, and not less than 82% $CF_3COOH$. The $CF_3COOH–H_2O$ system in the liquor as made by $CF_3COCl$ gassing and introduced into the still should not contain less than about 85% $CF_3COOH$, since lower $CF_3COOH$ strength liquor, on distillation, does not afford any particularly desirable quantity production of anhydrous $CF_3COOH$. Further, on termination of $CF_3COCl$ gassing, $CF_3COOH$ strength of $CF_3COOH–H_2O$ system in the reactor should not appreciably exceed about 95% because when, during gassing, $CF_3COOH$ strength reaches about 95%, leaving only about 5% $H_2O$ available for further hydrolysis, hydrolysis rate slows down to disadvantageous value.

Distillation is usually carried out to the best permissible extent to facilitate recovery of maximum amount of $CF_3COOH$ product. Hence, distillation is ordinarily continued until the system in the heel in the still contains close to but not less than about 82% $CF_3COOH$ and not more than 18% $H_2O$, a composition workably close to the 80% $CF_3COOH$–20% $H_2O$ azeotrope. It has been found that by maintaining take-off temperature of the still at approximately the 72° C. boiling point of $CF_3COOH$ and stopping distillation at a heel composition substantially at or slightly above 82% $CF_3COOH$–18% $H_2O$, $CF_3COOH$ present in the distillation liquor above the 82% $CF_3COOH$ value may be substantially quantitatively stripped out and recovered as substantially anhydrous $CF_3COOH$ without carryover into the product of any appreciable amount of the 80% $CF_3COOH$–20% $H_2O$ azeotrope boiling at about 105–106° C.

The distillation heel is returned to the reactor for use as a starting liquor in a second $CF_3COCl$ gassing cycle, assuming a batch operation. The second cycle requires addition to the process of further $H_2O$ in quantity substantially one to one molecularly equivalent to the amount of $CF_3COCl$ gas to be charged during such second cycle. Needed amount of $H_2O$ may be added in bulk to the distillation heel prior to further $CF_3COCl$ gassing or may be introduced incrementally during gassing. Although substantially mol for mol charging of $H_2O$ and incoming $CF_3COCl$ gas is preferred, particularly in batch operations, greater amounts of $H_2O$ may be introduced in a succeeding cycle, the only appreciable difference being that greater gassing time is required to bring the liquor in the reactor up to the above indicated values as to $CF_3COOH$ strength. Having taken into account addition to the process of the required or greater quantities of water, gassing with $CF_3COCl$ is again started, and the hydrolysis and distillation stages as described are repeated.

A liquid reaction medium used at the start of $CF_3COOH$ gassing in the hydrolysis stage should comprise a $CF_3COOH–H_2O$ system containing at least 10% $H_2O$ and not more than 90% $CF_3COOH$. With $CF_3COOH$ strength at the outset of gassing greater than about 90%, $H_2O$ available for hydrolysis is limited, and the amount of $CF_3COOH$ "make" during the succeeding gassing might be undesirably low. It is noted that the distillation stage heels as returned for further $CF_3COCl$ gassing always comprise systems containing more than 10% $H_2O$, and preferably at least 15%. Hence, during a starting-up operation and during a multi-cycle operation, there is always formed a liquid reaction medium comprising a $CF_3COOH–H_2O$ system containing at least 10% $H_2O$ and not more than 90% $CF_3COOH$, which system is thereafter subjected to $CF_3COCl$ gassing.

The invention processes may be carried out on a continuous cyclic basis involving continuous gassing, hydrolysis, distillation, and recycle of distillation heel. For any given operation regulation of control factors, such as optimum rates of gassing, transfer of liquors from and to the hydrolysis and distillation stages, and liquor compositions are within the skill of the art. In a continuous operation, to facilitate maintenance of process balance, it is preferred to feed to the hydrolysis stage a $$CF_3COOH–H_2O$$

system containing at least 50% $H_2O$ and not more than 50% $CF_3COOH$.

The following illustrate practice of the invention.

*Example 1.*—About 209 g. of a solution consisting of 160 g. (1.43 m.) of substantially pure anhydrous $CF_3COOH$ and 49 g. (2.72 m.) of water were charged into a reactor equipped with an agitator, an inlet for introduction of gaseous $CF_3COCl$, and a gas outlet connected in series with a Dry-Ice trap and a water scrubber. The solution in the reactor had a $CF_3COOH$ strength of about 77%. During 2 hours, 106 g. (0.8 m.) of substantially pure gaseous $CF_3COCl$ were charged into the reactor at a substantially constant rate. Hydrolysis initiated immediately on introduction of $CF_3COCl$, and reaction was moderately exothermic. Throughout the run, temperature in the reactor was maintained at about 24–41° C. by means of a cold water bath in which the reactor was partially immersed. Evolution of substantial quantities of HCl began after about half of the $CF_3COCl$ had been added. On completion of $CF_3COCl$ feed, the liquor in the reactor was put on reflux for about 30 min. to facilitate clean out of occluded HCl which passed through the Dry-Ice trap and was picked up in the water scrubber along with the HCl which had been evolved by reaction. During $CF_3COCl$ charging, some $CF_3COOH$ was carried out of the reactor entrained in the gaseous HCl and condensed out of the gas in the Dry-Ice trap in which about 15 g. of solid $CF_3COOH$ were recovered. The latter was combined with the liquor in the reactor to form a total of about 276 g. of material which, on the basis of the total $H_2O$ charged and water consumed by the $CF_3COCl$, contained about 88% (weight) of $CF_3COOH$, and about 12% water. The liquor in the reactor was distilled, using a 27" glass helix packed, vacuum jacketed column of about 0.5" I.D. Distillation was regulated so as to take off as overhead boiling at about 71–72° C. About 91 g. (0.80 m.) of water-white liquid were recovered as overhead, and identified by known boiling point, infrared and vapor fractometer analyses and neutral equivalent to be about 97% trifluoroacetic acid. The $CF_3COOH$ still bottoms amounted to about 185 g. of liquor which on analysis was shown to contain about 18.3% $H_2O$ (Karl Fischer titration) and 0.12% chlorine (standard turbidimetric method), balance $CF_3COOH$. The recovered 91 g. of 71–72° C. B.P. condensate represented a yield of about 89% on basis of $CF_3COCl$ fed. The product was found to have a neutral equivalent of about 118 (theory 114) which corresponds to 97% trifluoroacetic acid; water content about 0.17% (Karl Fischer titration) and chlorine content (turbidimetric) of less than 0.001%. Weight balance of the run was as follows:

|  | Charge | | | Recovery | |
| --- | --- | --- | --- | --- | --- |
|  | g. | m. |  | g. | m. |
| $CF_3COOH$ | 160 | 1.43 | HCl | 28.0 | 0.77 |
| $H_2O$ | 49 | 2.72 | Overhead $CF_3COOH$ | 91.0 | 0.80 |
| $CF_3COCl$ | 106 | 0.80 | Residue $CF_3COOH$ | 152 | 1.33 |
|  |  |  | $H_2O$ | 33 | 1.82 |
|  | 315 |  |  | 304 |  |

About 243 g. of trifluoroacetic acid were accounted for out of a theoretical 254 g.

Example 2.—About 153 g. of solution consisting of 144 g. (1.26 m.) of substantially pure anhydrous $CF_3COOH$ and 9 g. (0.50 m.) of water, a 94% (weight) strength $CF_3COOH$ solution, was introduced into the reactor of Example 1. During a 1.3 hour period, 54 g. (0.41 m.) of substantially pure gaseous $CF_3COCl$ were charged into the reactor at a substantially constant rate. Hydrolysis and evolution of HCl initiated immediately on introduction of $CF_3COCl$. Throughout the run, temperature in the reactor was maintained at about 28–35° C. by means of a water bath as in Example 1. During $CF_3COCl$ charging, particularly toward the end of the run, some $CF_3COOH$ and some unreacted $CF_3COCl$ were carried out in the reactor entrained in the gaseous HCl. All of the HCl evolved was picked up in the water scrubber. There were obtained in the reactor 182 g. crude product which contained about 2.1% water (Karl Fischer titration), 0.05% chlorine (turbidimetric) and 94% $CF_3COOH$ (neutral equivalent). HCl titration of the liquor in the water scrubber showed recovery of 0.24 mol as compared with 0.41 mol theory. Weight increase of material in the reactor and recovery of HCl in the water scrubber demonstrate considerably better than 50% reaction when water content of a water-$CF_3COOH$ solution is 6% and less, and that $CF_3COCl$ reacts with the water when water content of the solution is as low as 2–3%.

We claim:

1. A cyclic process for making trifluoroacetic acid which includes the steps of:

(a) forming in a reaction zone a liquid reaction medium comprising a $CF_3COOH-H_2O$ system containing at least 10% of $H_2O$, (b) introducing $CF_3COCl$ into said medium while maintaining the same at hydrolyzing temperatures substantially in the range of 20–60° C. to thereby effect reaction of $CF_3COCl$ with $H_2O$ to form a reaction mass comprising $CF_3COOH$, (c) maintaining said introduction of $CF_3COCl$ sufficient to raise the percentage of $CF_3COOH$ in the system to an increasingly higher value which is not more than about 95% but is at least 85%, (d) subjecting the reaction mass to distillation under conditions to form an overhead boiling at substantially 72° C. at atmospheric pressure and comprising substantially anhydrous $CF_3COOH$, and to form a distillation heel comprising a $CF_3COOH-H_2O$ system containing less $CF_3COOH$ than said reaction mass, not more than 18% $H_2O$, and not less than 82% $CF_3COOH$, (e) returning said heel to said reaction zone and (f) subjecting said heel therein to repetition of steps (b) and (c) in the presence of added $H_2O$ in amount at least equivalent to that needed for hydrolysis of incoming $CF_3COCl$.

2. The process of claim 1 in which step (c) is carried out so that the percentage of $CF_3COOH$ in the system is raised to a value which is not more than about 92% of the system.

3. The process of claim 2 in which step (a), as described in claim 1, is carried out so as to form a liquid reaction medium comprising $CF_3COOH-H_2O$ system containing at least 50% of $H_2O$.

4. The process of claim 2 in which the hydrolyzing temperatures, as described in step (b) of claim 1, are maintained substantially in the range of 20–45° C.

5. The process of claim 2 in which liquor of the reaction mass obtained, as described in step (C) of claim 1, is transferred to a distillation zone and the thus transferred liquor is then subjected to distillation under conditions described in part (d) of claim 1.

References Cited by the Examiner
UNITED STATES PATENTS 2,870,213  1/1959  Woolf _____ 260—539
2,922,816  1/1960  Bruce _____ 260—539
3,160,659  12/1964  Dittman et al. _____ 260—539

LORRAINE A. WEINBERGER, Primary Examiner.

LEON ZITVER, Examiner.

D. P. CLARKE, A. P. HALLUIN, Assistant Examiners.